United States Patent [19]

Sasaki et al.

[11] Patent Number: 4,916,099

[45] Date of Patent: * Apr. 10, 1990

[54] SOLID CATALYST COMPONENT FOR OLEFIN COPOLYMERIZATION AND PROCESS FOR OLEFIN COPOLYMERIZATION USING SAID SOLID CATALYST COMPONENT

[75] Inventors: Toshio Sasaki; Yoshihiro Miyoshi; Takeshi Ebara, all of Ichihara; Kiyoshi Kawai, Chiba, all of Japan

[73] Assignee: Sumitomo Chemical Company, Limited, Osaka, Japan

[*] Notice: The portion of the term of this patent subsequent to Sep. 13, 2006 has been disclaimed.

[21] Appl. No.: 237,324

[22] Filed: Aug. 29, 1988

[30] Foreign Application Priority Data

Sep. 9, 1987 [JP] Japan ................ 62-227032

[51] Int. Cl.$^4$ ........................... C08F 4/64
[52] U.S. Cl. ........................... 502/126; 502/115; 502/116; 502/120; 526/119
[58] Field of Search ............ 502/115, 116, 120, 126

[56] References Cited

U.S. PATENT DOCUMENTS

| | | | |
|---|---|---|---|
| 4,210,734 | 7/1980 | Machon | 526/65 |
| 4,302,565 | 11/1981 | Goeke et al. | 526/88 |
| 4,335,016 | 6/1982 | Dombro | 252/429 B |
| 4,388,219 | 6/1983 | Bujadoux | 252/429 C |
| 4,426,315 | 1/1984 | Bahadir et al. | 502/126 X |
| 4,670,413 | 6/1987 | Furtek | 502/120 |
| 4,771,023 | 9/1988 | Sasaki et al. | 502/116 |

FOREIGN PATENT DOCUMENTS

| | | |
|---|---|---|
| 0095855 | 12/1983 | European Pat. Off. . |
| 0196585 | 10/1986 | European Pat. Off. . |
| 0244678 | 11/1987 | European Pat. Off. . |
| 0245854 | 11/1987 | European Pat. Off. . |
| 51-144397 | 12/1976 | Japan . |
| 54-52192 | 4/1979 | Japan . |
| 54-148093 | 11/1979 | Japan . |
| 56-18607 | 2/1981 | Japan . |
| 56-99209 | 8/1981 | Japan . |
| 57-87405 | 5/1982 | Japan . |
| 57-153007 | 9/1982 | Japan . |
| 57-190009 | 11/1982 | Japan . |
| 58-208303 | 12/1983 | Japan . |
| 1500873 | 2/1978 | United Kingdom . |
| 2057468 | 4/1981 | United Kingdom . |

Primary Examiner—Patrick P. Garvin
Attorney, Agent, or Firm—Stevens, Davis, Miller & Mosher

[57] ABSTRACT

A solid catalyst component for olefin copolymerization containing trivalent titanium compound, which is obtained by reducing a titanium compound represented by the general formula $Ti(OR^1)_nX_{4-n}$ (wherein $R^1$ is a hydrocarbon group of 1 to 20 carbon atoms, X is a halogen atom, and n is a number satisfying $0 < n \leq 4$) with an organomagnesium compound in the presence of a porous carrier having a pore volume of, at pore radius of 50 to 5,000 Å, at least 0.2 ml/g, or in the presence of an organosilicon compound having at least one Si-O bond and the porous carrier to obtain a solid product, treating the solid product with a mixture of an ether compound and titanium tetrachloride, a catalyst system for olefin copolymerization comprising the above-mentioned solid catalyst component and an organoaluminum compound, as well as a process for olefin copolymerization using said catalyst system.

18 Claims, 2 Drawing Sheets

FIG. 1

SOLID CATALYST COMPONENT FOR OLEFIN COPOLYMERIZATION AND PROCESS FOR OLEFIN COPOLYMERIZATION USING SAID SOLID CATALYST COMPONENT

BACKGROUND OF THE INVENTION

1. Field of the Invention

The present invention relates to a process for copolymerizing olefins at a high temperature of 130° C. or above by the use of a novel Ziegler type catalyst system. More particularly, the invention relates to a process for producing an olefin copolymer having a narrow molecular weight distribution and a narrow composition distribution by the use of a solid catalyst component having a very high activity per transition metal.

2. Description of the Prior Art

The production of olefin polymers at high temperature by the use of Ziegler type catalyst is carried out according to the following processes. The first process is the so-called "solution process" in which an olefin is polymerized or copolymerized in the presence of a solvent such as cyclohexane or the like. In this process, an olefin is polymerized with a Ziegler type catalyst usually at a temperature of 120° C. to 250° C., at a pressure of 5 to 50 kg/cm$^2$, in the state of polymer solution. The second process is the so-called "high-pressure ion process" in which an olefin is polymerized or copolymerized at a high temperature, at a high pressure, in the absence of solvent, in the state of molten polymer.

As are well known, these high-temperature solution polymerization process and high pressure ion polymerization process using Ziegler type catalyst are advantageous in that the reactor is compact and the comonomer can be selected with a high degree of freedom. In such high-temperature polymerization processes, however, many of the Ziegler type catalysts show a rapid decrease in the polymerization activity or catalyst efficiency in a relatively short period of time, even if they exhibit a high polymerization activity in the early stage of the polymerization, and they leave a large amount of catalyst residue after the polymerization. Particularly in case of transition metal catalysts such as Ziegler type catalyst, the catalyst residue remaining in polymer exercises an adverse influence on its quality, and therefore a large-scale installation such as a step for removing the catalyst or a step for purifying the polymer must be provided when a large amount of catalyst residue is left in polymer. In case that a metal halide such as halogenated titanium compound and the like is used as the solid catalyst, the apparatuses and instruments must be protected against the corrosion caused by active halogen, and therefore the polymerization activity per solid catalyst must be sufficiently high.

Now, olefin copolymers are put to very many uses such as film, laminate, coating of electric wire, injection molded articles, special molded articles, etc. As is generally known, the use of a polymer narrow in molecular weight distribution and composition distribution is desirable in these uses from the viewpoint of obtaining a product excellent in transparency, impact resistance, blocking resistance, etc. Particularly in case of copolymers, molecular weight distribution and composition distribution exercise an increasing influence upon the properties of olefin copolymer as the content of alpha-olefin in copolymer increases, so that an olefin copolymer having narrow molecular weight distribution and composition distribution is desired.

Although various improvements have hitherto been proposed concerning the Ziegler-type solid catalyst for use at high temperature (for example, Japanese patent application Kokai (Laid-Open) Nos. 51-144397, 54-52192, 56-18607, 56-99209, 57-87405, 57-153007, 57-190009 and 58-208303), none of them can be said to be satisfactory in the point of catalyst activity. Further, none of them can give a copolymer having narrow molecular weight distribution and composition distribution.

On the other hand, as a process for obtaining an olefin copolymer having narrow molecular weight distribution and composition distribution, there is known the method of copolymerizing an olefin by the use of a catalyst formed from a vanadium type catalyst component and an organoaluminum compound catalyst component. However, this catalyst is low in activity per transition metal, and its activity further decreases when used in copolymerization reaction at a high temperature of 130° C. or above.

SUMMARY OF THE INVENTION

In view of the above-mentioned circumstances, the problem to be solved by the present invention, i.e., the object of the present invention is to provide a process for producing an olefin polymer having a narrow molecular weight distribution and composition distribution by the use of a solid catalyst component having a high catalyst activity per transition metal so that the removal of catalyst residue becomes unnecessary.

According to the present invention, there is provided a solid catalyst component for olefin copolymerization containing a trivalent titanium compound, which is obtained by reducing a titanium compound represented by the general formula Ti(OR$^1$)$_n$X$_{4-n}$ (wherein R$^1$ is a hydrocarbon group of 1 to 20 carbon atoms, X is a halogen atom, and n is a number satisfying $0 < n \leq 4$) with an organomagnesium compound in the presence of a porous carrier having a pore volume of, at pore radius of 50 to 5,000 Å, at least 0.2 ml/g to obtain a solid product, treating the solid product with a mixture of an ether compound and titanium tetrachloride.

According to the present invention, there is also provided a solid catalyst component for olefin copolymerization containing a trivalent titanium compound, which is obtained by reducing a titanium compound represented by the general formula TI(OR$^1$)$_n$X$_{4-n}$ (wherein R$^1$, X and n are as defined above) with an organomagnesium compound in the presence of an organosilicon compound having at least Si—O bond and a porous carrier having a pore volume of, at pore radius of 50 to 5,000 Å, at least 0.2 ml/g to obtain a solid product and treating the solid product with a mixture of an ether compound and titanium tetrachloride.

According to the present invention, there is further provided a process for olefin copolymerization using a catalyst system comprising:

(A) a solid catalyst component containing a trivalent titanium compound as mentioned above, and (B) an organoaluminum compound at a temperature of 130° C. or above.

According to the process of the present invention as mentioned above, the above-mentioned object can be achieved.

BRIEF DESCRIPTION OF THE DRAWINGS

In the accompanying drawings.

DETAILED DESCRIPTION OF THE INVENTION

Figure 1:
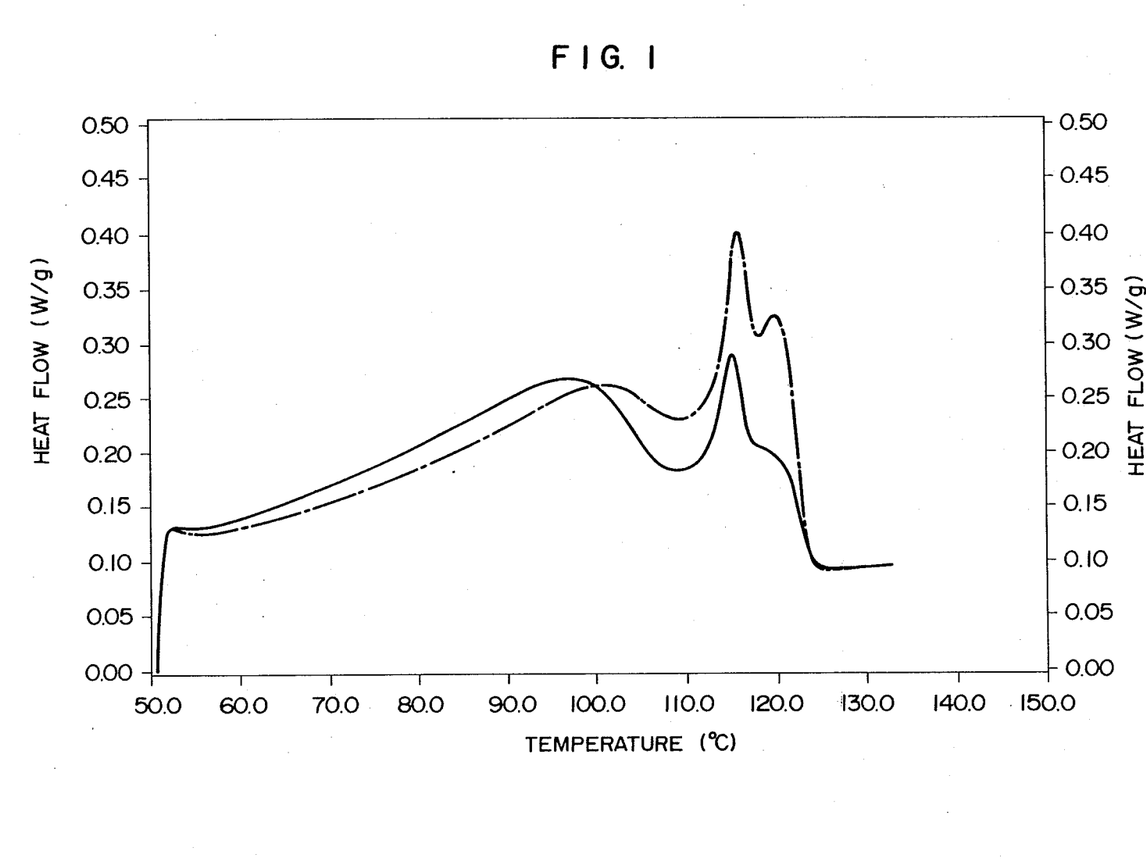
FIG. 1 is a chart diagram illustrating the differential scanning calorimeter measurements of the polymers obtained in Example 1 (solid line) and Comparative Example 1 (broken line).
Figure 2:
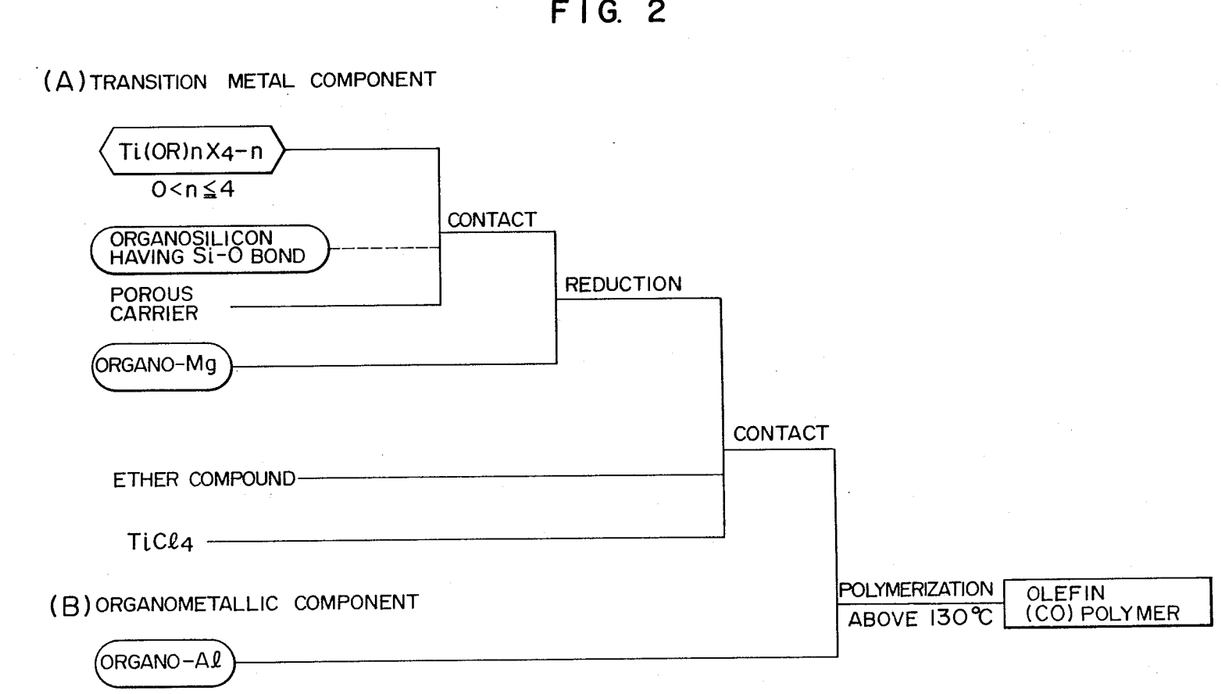
FIG. 2 is a flow chart diagram facilitating the understanding of the present invention. This diagram is merely one typical example of the embodiments of the invention, and the invention is by no means limited thereby.

The present invention will be explained below more concretely.

(a) Titanium compound

The titanium compound used in the present invention is represented by the general formula $Ti(OR^1)_nX_{4-n}$ (wherein $R^1$ represents a hydrocarbon group having 1 to 20 carbon atoms, X represents a halogen atom, and n represents a number satisfying $0<n\leq4$). Concrete examples of $R^1$ include alkyl groups such as methyl, ethyl, propyl, isopropyl, butyl, isobutyl, amyl, isoamyl, hexyl, heptyl, octyl, decyl, dodecyl and the like; aryl groups such as phenyl, cresyl, xylyl, naphthyl and the like; cycloalkyl groups such as cyclohexyl, cyclopentyl and the like; allyl groups such as propenyl and the like; and aralkyl groups such as benzyl and the like. Among these groups, alkyl groups having 2 to 18 carbon atoms and aryl groups having 6 to 18 carbon atoms are preferable, and straight chain alkyl groups having 2 to 18 carbon atoms are particularly preferable. Titanium compounds having two or more different $OR^1$ groups are also usable.

Examples of the halogen atom represented by X include chlorine, bromine and iodine, among which chlorine gives a particularly good result.

In the titanium compound represented by the general formula $Ti(OR^1)_nX_{4-n}$, the number n should satisfy $0<n\leq4$, preferably $2\leq n\leq4$, and particularly $n=4$.

As the synthetic process of the titanium compound represented by the general formula $Ti(OR^1)_nX_{4-n}$ ($0<n\leq4$), known processes can be adopted. For example, a process comprising reacting $Ti(OR^1)_4$ and $TiX_4$ at a desired ratio, or a process comprising reacting $TiX_4$ with a desired amount of corresponding alcohol can be adopted.

(b) Organosilicon compound having Si—O bond

The organosilicon compounds having Si—O bond used for the synthesis of component (A) of the present invention are represented by the following general formulas:

$Si(OR^2)_mR^3_{4-m}$ $R^4(R^5_2SiO)_pSiR^6_3$ $(R^7_2SiO)_q$ wherein $R^2$ represents a hydrocarbon group having 1 to 20 carbon atoms; $R^3$, $R^4$, $R^5$, $R^6$ and $R^7$ each represents a hydrocarbon group having 1 to 20 carbon atoms or a hydrogen atom; m represents a number satisfying $0<m\leq4$; p represents an integer of 1 to 1,000; and q represents an integer of 2 to 1,000.

As concrete examples of the organosilicon compound, the following can be referred to:

tetramethoxysilane, dimethyldimethoxysilane, tetraethoxysilane, triethoxyethylsilane, diethoxydiethylsilane, ethoxytriethylsilane, tetraisopropoxysilane, diisopropoxydiisopropylsilane, tetrapropoxysilane, dipropoxydipropylsilane, tetrabutoxysilane, dibutoxydibutylsilane, dicyclopentoxydiethylsilane, diethoxydiphenylsilane, cyclohexyloxytrimethylsilane, phenoxytrimethylsilane, tetraphenoxysilane, triethoxyphenylsilane, hexamethyldisiloxane, hexaethyldisiloxane, hexapropyldisiloxane, octaethyltrisiloxane, dimethylpolysiloxane, diphenylpolysiloxane, methylhydropolysiloxane, phenylhydropolysiloxane, and the like.

Among these organosilicon compounds, alkoxysilane compounds represented by the general formula $Si(OR^2)_mR^3_{4-m}$ are preferable. The number m preferably satisfies $1\leq m\leq4$. Among such compounds, tetraalkoxysilane compounds satisfying $m=4$ are particularly preferable.

(c) Organomagnesium compound

Next, as the organomagnesium compound of the present invention, arbitrary types of organomagnesium compounds having magnesium-carbon bond can be used. Among them, Grignard compounds represented by the general formula $R^8MgX$ ($R^8$ represents a hydrocarbon group having 1 to 20 carbon atoms, and X represents a halogen atom) and dialkylmagnesium compounds or diarylmagnesium compounds represented by the general formula $R^9R^{10}Mg$ ($R^9$ and $R^{10}$ each represents a hydrocarbon group having 1 to 20 carbon atoms) are particularly preferable. In these formulas, $R^8$, $R^9$ and $R^{10}$ may be identical or different from one another, and represent alkyl, aryl, aralkyl or alkenyl group having 1 to 20 carbon atoms such as methyl, ethyl, propyl, isopropyl, butyl, sec-butyl, tert-butyl, amyl, isoamyl, hexyl, octyl, 2-ethylhexyl, phenyl, benzyl, and the like.

More concretely saying, examples of said Grignard compound include methylmagnesium chloride, ethylmagnesium chloride, ethylmagnesium bromide, ethylmagnesium iodide, propylmagnesium chloride, propylmagnesium bromide, butylmagnesium chloride, butylmagnesium bromide, sec-butylmagnesium chloride, sec-butylmagnesium bromide, tert-butylmagnesium chloride, tert-butylmagnesium bromide, amylmagnesium chloride, isoamylmagnesium chloride, phenylmagnesium chloride, phenylmagnesium bromide and the like; and examples of said compound represented by $R^9R^{10}Mg$ include diethylmagnesium, dipropylmagnesium, diisopropylmagnesium, dibutylmagnesium, di-sec-butylmagnesium, di-tert-butylmagnesium, butyl-sec-butylmagnesium, diamylmagnesium, diphenylmagnesium and the like.

The solvents which can be used in the synthesis of the above-mentioned organomagnesium compounds include ethereal solvents such as diethyl ether, dipropyl ether, diisopropyl ether, dibutyl ether, diisobutyl ether, diamyl ether, diisoamyl ether, dihexyl ether, dioctyl ether, diphenyl ether, dibenzyl ether, phenetole, anisole, tetrahydrofuran, tetrahydropyran and the like. Further, hydrocarbon solvents such as hexane, heptane, octane, cyclohexane, methylcyclohexane, benzene, toluene, xylene and the like, and mixtures of ethereal solvents and hydrocarbon solvents are also usable. Preferably, the organomagnesium compound is used in the state of an ether solution. As this ether compound, ether compounds having 6 or more carbon atoms in one molecule or ether compounds having a cyclic structure are used.

From the viewpoint of catalyst performance, it is particularly preferable to use a Grignard compound represented by $R^8MgCl$ in the state of an ether solution.

Further, hydrocarbon-soluble complexes of the above-mentioned organomagnesium compound and an organometallic compound are also usable. As examples of said organometallic compound, organic compounds of Li, Be, B, Al and Zn can be referred to.

(d) Porous carrier

As the porous carrier usable in the invention, solid inorganic oxides such as silica gel, alumina, silica-alumina, magnesia, zirconia and the like can be referred to. Further, polymers such as polyethylene, polypropylene, polystyrene, styrene-divinylbenzene copolymer and the like can also be referred to. These carriers are used either in the state of single material or in the state of a mixture of two or more materials. Among them, solid inorganic oxides are preferable, and silica gel, alumina or silica-alumina is particularly preferable. Particle diameter of the porous carrier is preferably in the range of 0.1 to 100 μm, and more preferably in the range of 1 to 50 μm. Its mean pore radius is preferably 50 Å or above, and more preferably 75 Å or above. As measured in the pore radius range of 50 to 5,000 Å, its pore volume is preferably 0.2 ml/g or above, more preferably 0.3 ml/g or above, and particularly 0.4 ml/g or above.

Preferably, the porous carrier is put to use after removing the adsorbed water. Concretely saying, it is calcined at a temperature of about 300° C. or above or vacuum-dried at a temperature of about 100° C. or above, and then treated with an organometallic compound such as organomagnesium compound or the like and put to use, for example.

(e) Ether compound

Next, preferable examples of the ether compound used in the present invention include dialkyl ethers such as diethyl ether, dipropyl ether, diisopropyl ether, dibutyl ether, diamyl ether, diisoamyl ether, dineopentyl ether, dihexyl ether, dioctyl ether, methyl butyl ether, methyl isoamyl ether, ethyl isobutyl ether and the like. Among them, dibutyl ether and diisoamyl ether are particularly preferable.

(f) Synthesis of solid catalyst component (A)

The solid catalyst component (A) of the present invention is synthesized by treating a solid product obtained by reducing a titanium compound represented by the general formula $Ti(OR^1)_nX_{4-n}$ with an organomagnesium compound in the presence of a porous carrier, with a mixture of an ether compound and titanium tetrachloride. More preferably, it is synthesized by treating a solid product obtained by reducing the titanium compound with an organomagnesium compound in the presence of an organosilicon compound having Si—O bond and a porous carrier, with a mixture of an ether compound and titanium tetrachloride. In the above-mentioned synthesis of the solid catalyst component (A), the deposition of solid matter upon the reduction preferably occurs on the porous carrier and said solid product maintains the shape of porous carrier without formation of fine powder.

As the method for reducing a titanium compound with an organomagnesium compound, a method which comprises adding an organomagnesium compound to a mixture of the titanium compound, an organosilicon compound and a porous carrier can be referred to.

Preferably, said titanium compound, organosilicone compound and porous carrier are put to use after dissolving or diluting them with an appropriate solvent.

Solvents which can be used for this purpose include aliphatic hydrocarbons such as hexane, heptane, octane, decane and the like; aromatic hydrocarbons such as toluene, xylene and the like; alicyclic hydrocarbons such as cyclohexane, methylcyclohexane, decalin and the like; and ether compounds such as diethyl ether, dibutyl ether, diisoamyl ether, tetrahydrofuran and the like.

Temperature of the reduction is −50° C. to 70° C., preferably −30° C. to 50° C., and particularly −25° C. to 35° C.

Although the dropping time is not critical, it is usually about 30 minutes to 6 hours. It is also allowable to carry out a post-reaction at a temperature of 20° C. to 120° C. after completion of the reduction.

As expressed in terms of atomic ratio of silicon atom to titanium atom (Si/Ti), said organosilicone compound is used in an amount ranging from 0 to 50, preferably 1 to 30, and particularly 3 to 25.

As expressed in terms of atomic ratio of the sum of titanium atom and silicon atom to magnesium atom [(Ti+Si)/Mg], said organomagnesium compound is used in an amount ranging from 0.1 to 10, preferably 0.2 to 5.0, and particularly 0.5 to 2.0.

As expressed in terms of % by weight based on the weight of solid product, said porous carrier is used in an amount ranging from 20% to 90%, and preferably 30% to 75%.

The solid product formed by the reduction is separated from the liquid phase and washed several times with an inert hydrocarbon solvent such as hexane, heptane or the like.

The solid product thus obtained contains trivalent titanium, magnesium and hydrocarbyloxy group, and it is generally amorphous or only weakly crystalline. From the viewpoint of catalyst performance, amorphous structure is more desirable than the other.

Next, the solid product obtained above is treated with a mixture of an ether compound and titanium tetrachloride. The treatment of solid product with mixture of ether compound and titanium tetrachloride is preferably carried out in the state of a slurry. The solvents which can be used for making a slurry include aliphatic hydrocarbons such as pentane, hexane, heptane, octane, decane and the like; aromatic hydrocarbons such as toluene, xylene and the like; alicyclic hydrocarbons such as decalin, cyclohexane, methylcyclohexane and the like; and halogenated hydrocarbons such as dichlorethane, trichlorethane, trichlorethylene, monochlorobenzene, dichlorobenzene, trichlorobenzene and the like.

The slurry concentration is preferably 0.05 to 0.5 g-solid/ml-solvent and particularly 0.1 to 0.3 g-solid/ml-solvent.

The reaction temperature is 30° C. to 150° C., preferably 45° C. to 120° C., and particularly 60° C. to 100° C. Though the reaction time is not critical, a reaction time of 30 minutes to 6 hours is usually preferable.

The method for treating the solid product with an ether compound and titanium tetrachloride may be any of the method which comprises adding an ether compound and titanium tetrachloride to the solid product and the method which comprises adding, inversely, the solid product into a solution composed of ether compound and titanium tetrachloride.

In the method which comprises adding ether compound and titanium tetrachloride to the solid product, the ether compound and titanium tetrachloride may be added successively in this order. However, addition of a previously prepared mixture of ether compound and titanium tetrachloride or simultaneous addition of ether compound and titanium tetrachloride is particularly preferable.

The reaction between the solid product and the ether compound and titanium tetrachloride may be repeated twice or more.

Said ether compound is used in an amount of 0.1 to 100 moles, preferably 0.5 to 50 moles and particularly 1 to 20 moles, per 1 mole of the titanium atom present in the solid product.

Said titanium tetrachloride is added in an amount of 1 to 1,000 moles, preferably 3 to 500 moles and particularly 10 to 300 moles, per 1 mole of the titanium atom present in the solid product. Per one mole of the ether compound, titanium tetrachloride is added in an amount of 1 to 100 moles, preferably 1.5 to 75 moles and particularly 2 to 50 moles.

The trivalent titanium compound-containing solid catalyst component obtained according to the above-mentioned procedure is separated from liquid phase, washed several times with an inert hydrocarbon solvent such as hexane, heptane or the like, and then put to use for polymerization.

According to one allowable embodiment, the solid catalyst component separated from liquid phase is first washed with a large quantity of halogenated hydrocarbon solvent such as monochlorobenzene or the like or aromatic hydrocarbon such as toluene, xylene or the like at least once at a temperature of 50° C. to 120° C., after which it is several times washed with an aliphatic hydrocarbon solvent such as hexane or the like and then put to use for polymerization.

In putting the process of the present invention to practice, it is also allowable to subject the solid catalyst component (A) to a preliminary polymerization or copolymerization treatment according to the known procedure with a small quantity of olefin such as ethylene, $C_3$–$C_{10}$ alpha-olefin or the like in the presence of an organometallic compound of a metal belonging to Groups I to III of the periodic table, prior to putting it to use for olefin polymerization. The temperature of said preliminary polymerization is 20° C. to 100° C. and preferably 20° C. to 50° C., and quantity of said preliminary polymerization is 0.05 to 100 g and particularly 0.1 to 50 g per 1 g of the solid catalyst component (A).

(g) Organoaluminum compound (B)

The organoaluminum compound (B) which is used in combination with the above-mentioned solid catalyst component (A) in the present invention is an organoaluminum compound having at least one Al-carbon bond in its molecule. Typical organoaluminum compounds usable for this purpose are represented by the following general formulas:

wherein $R^{11}$, $R^{12}$, $R^{13}$, $R^{14}$ and $R^{15}$ each represents a hydrocarbon group having 1 to 8 carbon atoms, Y represents a halogen atom, a hydrogen atom or an alkoxy group, and r represents a number satisfying $1 \leq r \leq 3$.

Concrete examples of said organoaluminum compound include trialkylaluminums such as triethylaluminum, triisobutylaluminum, trihexylaluminum and the like; dialkylaluminum halides such as diethylaluminum chloride, diisobutylaluminum chloride and the like; alkylaluminum sesquihalides such as ethylaluminum sesquichloride and the like; alkylaluminum dihalides such as ethylaluminum dichloride and the like; and alkylalkoxyaluminums such as diethylethoxyaluminum and the like. Further, aluminoxanes such as bisdiethylaluminoxane and the like and alkylsiloxalanes such as trimethyldiethylsiloxalane and the like are also usable. These organoaluminum compounds may be used either in the state of single material or in the state of a mixture of two or more materials.

Among these organoaluminum compounds, alkylaluminum sesquihalides, dialkylaluminum halides and trialkylaluminums are preferable, and ethylaluminum sesquichloride and trialkylaluminums having $C_4$ or higher alkyl groups such as tributylaluminum, triisobutylaluminum and the like are particularly preferable.

Said organoaluminum compound may be used in so widely ranging an amount as 1 to 1,000 moles per 1 mole of titanium atom present in the solid catalyst. However, the particularly preferable range of its amount is 3 to 600 moles per 1 mole of titanium atom.

(h) Method for the olefin polymerization

The method for supplying the catalyst components into polymerization reactor is not critical, so long as they are fed in a water-free state in an inert gas such as nitrogen, argon or the like.

Catalyst components (A) and (B) may be supplied separately. Otherwise, they may also be supplied after a mutual contact.

The conditions of the polymerization in the present invention are as follows. Thus, the temperature is 130° C. or above, preferably 135° C. to 350° C., and more preferably 150° C. to 270° C. In case of solution process, the pressure of polymerization is 5 to 100 kg/cm² and preferably 10 to 50 kg/cm². In case of high-pressure ion process, it is 350 to 3,500 kg/cm² and preferably 700 to 1,800 kg/cm². As the mode of polymerization, both batch system and continuous system are adoptable.

In the solution polymerization process using the catalyst system of the present invention, the solvent is usually selected from hydrocarbon solvents such as hexane, cyclohexane, heptane, kerosene components, toluene and the like.

The olefins to which the present invention is applicable are ethylene and alpha-olefins having 3 to 20 carbon atoms and preferably 3 to 10 carbon atoms. Examples of said alpha-olefin include propylene, butene-1, 4-methylpentene-1, hexene-1, octene-1, vinylcyclohexane and the like.

The present invention is particularly effectively applicable to the production of copolymers constituted of at least 80% by mole of ethylene and a residual percentage of other alpha-olefins, particularly propylene, butene-1, 4-methylpentene-1, hexene-1, octene-1 and the like.

It is also possible to add a chain transfer agent such as hydrogen and the like for the purpose of regulating the molecular weight of polymer.

Further, it is also possible to add a known electron-donor to the copolymerization system for the purpose of improving the stereospecificity and molecular weight of polymer. Typical examples of said electron-donor include organic carboxylic esters such as methyl methacrylate, methyl toluate and the like; phosphorous esters such as triphenyl phosphite and the like; and silicic acid esters having at least one Si—OR bond (wherein R is hydrocarbon group having 1 to 20 carbon atoms) such as tetraethoxysilane, phenyltriethoxysilane and the like.

Next, the present invention will be explained in more detail with reference to the following examples and comparative examples.

The properties of polymers mentioned in the examples were measured by the following methods.

Thus, density was measured according to JIS K-6760. Melt index (MI) was measured according to ASTM 1238-57-T. As the measure for expressing composition distribution, mean melting point ($\overline{T}_m$) was used. It was measured by means of differential scanning calorimeter and calculated according to the following equation:

$$T_m = \frac{\Sigma H_i \times t_i}{\Sigma H_i}$$

(50° C.$<t_i<$130° C.; $H_i$ represents the heat flow (W/g) at temperature $t_i$)

EXAMPLE 1

(1) Synthesis of Organomagnesium Compound

After replacing the inner atmosphere of a 2 liter flask equipped with a stirrer, a reflux condenser, a dropping funnel and a thermometer with argon, 64.0 g of sliced metallic magnesium for Grignard reaction was charged thereinto. Into the dropping funnel, 240 g of butyl chloride and 1,000 ml of dibutyl ether were charged, and about 30 ml portion of their mixture was dropped onto the magnesium in the flask to start the reaction. After starting the reaction, dropping was continued at 50° C. over 6 hours. After completing the dropping, the reaction was continued at 60° C. for additional one hour. Then, the reaction mixture was cooled to 20° C. and the solid matter was filtered off.

The butylmagnesium chloride in dibutyl ether, thus obtained, was hydrolyzed with 1N sulfuric acid, and the concentration was determined by back titration using 1N sodium hydroxide solution. As the indicator, phenolphthalein was used. As the result, the concentration of butylmagnesium chloride was 2.03 moles/liter.

(2) Synthesis of Solid Product

A silica gel [Grade 952, manufactured by Fuji Devison Kagaku K.K.; pore volume ml/g measured in the pore radius range of 50 to 5,000 Å by the use of porosimeter (said pore volume is hereinafter referred to as "dvp") dvp=0.89] was calcined at 800° C. for 6 hours in an atmosphere of argon gas.

Subsequently, after replacing the inner atmosphere of a flask having a capacity of 300 ml and equipped with a stirrer and a dropping funnel with argon, 23.0 g of the silica gel obtained above was charged into the flask together with 120 ml of heptane, 1.6 ml of tetrabutoxytitanium and 17.7 ml of tetraethoxysilane, and the resulting mixture was stirred at 20° C. for 30 minutes. Then, 41.8 ml of the organomagnesium compound synthesized in (1) was dropped into the flask over a period of 60 minutes, while keeping the inner temperature of the flask at 5° C. After dropping it, the content of the flask was stirred at 5° C. for 30 minutes and then at 20° C. for one hour. Then, it was allowed to stand at room temperature to separate solid from liquid. The solid matter was washed thrice with each 120 ml portions of heptane and dried under reduced pressure. Thus, a brown-colored solid product was obtained.

(3) Synthesis of Solid Catalyst Component

After replacing the inner atmosphere of a flask having a capacity of 100 ml with argon, 10.0 g of the solid product prepared in (2) and 30 ml of toluene were charged into the flask, and inner temperature of the flask was kept at 95° C.

Then, a mixture consisting of 2.0 ml of butyl ether and 39 ml of titanium tetrachloride was added and reacted at 95° C. for one hour.

After the reaction, the reaction mixture was allowed to stand, the solid material was separated from liquid phase, and it was washed four times with each 50 ml portions of toluene at 95° C. After drying it under reduced pressure, 9.4 g of a brown-colored solid product was obtained.

One gram of this solid catalyst contained 0.54 millimoles of titanium atom and 2 millimoles of magnesium atom. Its pore volume dvp was 0.34.

(4) Copolymerization of Ethylene and Butene-1

In an autoclave type continuous reactor having a capacity of 1 liter and equipped with a stirrer, an ethylene/butene-1 copolymerization was carried out under the conditions shown in Table 1 by the use of the solid catalyst component synthesized in (3). As the organoaluminum compound, ethylaluminum sesquichloride (EASC) was used. As the result of the polymerization, 92,000 g of polymer was obtained per one gram of transition metal. The polymer thus obtained was very narrow in both molecular weight distribution and composition distribution.

COMPARATIVE EXAMPLE 1

(1) Synthesis of Solid Product

After replacing the inner atmosphere of a flask having a capacity of 500 ml and equipped with a stirrer and a dropping funnel with argon, 9.1 ml of tetrabutoxytitanium, 100 ml of tetraethoxysilane and 180 ml of heptane were charged into the flask and made into a homogeneous solution. While keeping the inner temperature of the flask at 5° C., 236 ml of the organomagnesium compound synthesized in Example 1-(1) was slowly dropped from the dropping funnel over a period of 3 hours to carry out a reduction. After dropping it, the content of the flask was stirred for additional one hour at 20° C., after which it was allowed to stand at 20° C. to separate solid from liquid. After washing the solid thrice with each 300 ml portions of heptane, it was dried under reduced pressure to obtain a brown-colored solid product.

(2) Synthesis of Solid Catalyst Component

After replacing the inner atmosphere of a flask having a capacity of 200 ml with argon, 21.4 g of the solid product prepared in (1) and 20 ml of toluene were charged into the flask, and inner temperature of the flask was kept at 95° C.

Subsequently, a mixture of 4.7 ml of butyl ether and 83 ml of titanium tetrachloride was added and reacted at 95° C. for one hour. Then, the reaction mixture was allowed to stand at 20° C. to separate the solid from the liquid phase, and the solid material was washed four times with each 100 ml portions of toluene and dried under reduced pressure to obtain an ocher-colored solid catalyst component.

One gram of this solid catalyst contained 1.6 millimoles of titanium atom and 7.6 millimoles of magnesium atom. Its pore volume dvp was 0.18.

(3) Copolymerization of Ethylene and Butene-1

A copolymerization was carried out in the same manner as in Example 1, except that the solid catalyst component obtained in (2) was used. Since no porous carrier was used in the catalyst system of this example, the polymer obtained herein had broader molecular weight distribution and composition distribution.

COMPARATIVE EXAMPLE 2

(1) Synthesis of Solid Catalyst Component

A solid catalyst component was synthesized under the same conditions as in Example 1, except that, in the synthesis of solid product of Example 1-(2), Supermicro Beads Silica Gel 4B type manufactured by Fuji Devison Kagaku K.K. (dvp=0.15) was used as the silica gel and the amount of catalyst component impregnated into the silica gel was decreased to 2/3 time of that in Example 1. One gram of the solid catalyst component thus obtained contained 0.44 millimole of titanium atom and 1.44 millimoles of magnesium atom. Pore volume dvp of this solid catalyst component was as small as 0.07.

(2) Copolymerization of Ethylene and Butene-1

A copolymerization was carried out in the same manner as in Example 1, except that the solid catalyst component obtained in (1) of this example was used. Since the catalyst system of this example contained a carrier having a small pore volume, the polymer obtained herein had broader molecular weight distribution and composition distribution.

COMPARATIVE EXAMPLE 3

A polymerization was carried out in the same manner as in Example 1, except that the solid product obtained in Example 1-(2) was used as a solid catalyst component. As the result of the copolymerization, 13,000 g of copolymer was obtained per one gram of transition metal. This means that the polymerization activity of the catalyst was very low.

EXAMPLE 2

The solid catalyst component used in Example 1-(3) was ground with an vibration mill, so that its particle diameter reached 2 to 3 μm (dvp=0.30). A copolymerization was carried out in the same manner as in Example 1, except that the milled product was used as the solid catalyst component. The copolymer thus obtained was narrow in both molecular weight distribution and composition distribution similarly to that obtained in Example 1.

EXAMPLE 3

A copolymerization was carried out in the same manner as in Example 1, except that a mixture of ethylaluminum sesquichloride and tetraethoxysilane (atomic ratio Si/Al=0.1) was used as the organoaluminum compound. The copolymer thus obtained was narrow in molecular weight distribution and composition distribution similarly to that of Example 1.

EXAMPLE 4

A copolymerization was carried out in the same manner as in Example 1, except that monomer composition was altered. The results of the polymerization were as shown in Table 2. The copolymer thus obtained was narrow in molecular weight distribution and composition distribution similarly to that of Example 1.

EXAMPLE 5

A copolymerization of ethylene and hexene-1 was carried out with the same catalyst as in Example 1. The copolymer thus obtained was narrow in molecular weight distribution and composition distribution similarly to that of Example 1.

COMPARATIVE EXAMPLE 4

A copolymerization of ethylene and hexene-1 was carried out with the same catalyst as in Comparative Example 1. Since the catalyst system used in this example contained no porous carrier, the copolymer obtained herein had broader molecular weight distribution and composition distribution.

EXAMPLE 6

After replacing the inner atmosphere of a one-liter autoclave equipped with a stirrer with nitrogen gas sufficiently, 500 ml of kerosene component and 30 g of butene-1 were charged. After heating the autoclave up to 200° C., ethylene was fed until the total pressure reached 38 kg/cm$^2$. Then, 3.8 mg of the solid catalyst component obtained in Example 1-(3) and 0.25 millimole of ethylaluminum sesquichloride were added to start the copolymerization. Thereafter, the copolymerization was continued at 200° C. for one hour while continuously feeding ethylene so as to maintain a constant total pressure. After completion of the copolymerization, the fourmed polymer was collected by filtration and dried at 60° C. under reduced pressure. As the result of the copolymerization, 125,000 g of polymer was obtained per one gram of transition metal. The copolymer thus obtained was narrow in molecular weight distribution and composition distribution similarly to that of Example 1.

Catalyst activity: 125,000 g-polymer/g-transition metal; MI: 1.93 g/10 minutes; density: 0.930 g/cm$^3$; $M_w/M_n$: 3.4; $T_m$: 96.5° C.

COMPARATIVE EXAMPLE 5

A copolymerization was carried out in the same manner as in Example 6, except that the solid catalyst component obtained in Comparative Example 1 was used. As the result of polymerization, 32,000 g of copolymer was obtained per one gram of transition metal. Since the solid catalyst component used in this example contained no porous carrier, the catalyst was markedly low in activity.

EXAMPLE 7

A solid catalyst component was synthesized in the same manner as in Example 1, except that a silica gel having a dvp value of 0.80 ml/g and a mean pore radius of 150 Å was used as the silica gel. One gram of this solid catalyst component contained 0.53 millimole of titanium atom and 2.0 millimoles of magnesium atom. Pore volume dvp of this catalyst was 30.

Using this catalyst, a copolymerization of ethylene and butene-1 was carried out in the same manner as in Example 1-(4). The copolymer thus obtained was narrow in molecular weight distribution and composition distribution similarly to that of Example 1.

EXAMPLE 8

A solid catalyst component was synthesized in the same manner as in Example 1, except that the silica gel was replaced with Alumina ACP-1 grade manufactured by Shokubai Kasei K.K. (dvp=0.91). One gram of this solid catalyst contained 0.56 millimole of titanium atom and 2.0 millimoles of magnesium atom. Pore volume dvp of this catalyst was 0.38.

Using this catalyst, a copolymerization of ethylene and butene-1 was carried out in the same manner as in Example 1-(4). The copolymer thus obtained was narrow in molecular weight distribution and composition distribution similarly to that of Example 1.

EXAMPLE 9

(1) Synthesis of Solid Product

After replacing the inner atmosphere of a flask having a capacity of 500 ml and equipped with a stirrer and a dropping funnel with argon gas, 35.0 g of Chromosorb 101 (porous polymer beads made of styrene-divinylbenzene copolymer, dvp=0.54 ml/g, manufactured by Johns-Manville Co.) which had been vacuum-dried at 80° C. for one hour in advance and 140 ml of butyl ether were charged. While stirring them and keeping the inner temperature of the flask at 80° C., 100 ml of the organomagnesium compound synthesized in Example 1-(1) was dropped thereinto from the dropping funnel over a period of 60 minutes, and the resulting mixture was allowed to react at that temperature for additional one hour. After washing the product twice with each 100 ml portions of butyl ether and then twice with each 100 ml portions of heptane, it was dried under reduced pressure to obtain 35.2 g of an organomagnesium-treated product. Subsequently, after replacing the inner atmosphere of a flask having a capacity of 500 ml and equipped with a stirrer and a dropping funnel with argon gas, 30.0 g of the organomagnesium-treated product synthesized above was charged thereinto together with 150 ml of heptane, 2.6 ml of tetrabutoxytitanium and 25.3 ml of tetraethoxysilane. The content of the flask was stirred at 30° C. for 30 minutes.

Then, while keeping the inner temperature of the flask at 5° C., 68.6 ml of the organomagnesium compound synthesized in Example 1-(1) was dropped into the flask from the dropping funnel over a period of 2 hours. After dropping it, the mixture was stirred at 5° C. for one hour and then at room temperature for one hour, and then the solid material was washed thrice with each 150 ml portions of heptane and dried under reduced pressure to obtain 50.2 g of a brown colored solid product.

(2) Synthesis of Solid Catalyst Component

After replacing the inner atmosphere of a flask having a capacity of 500 ml with argon gas, 43.8 g of the solid product, 145 ml of toluene, 9.6 ml of butyl ether and 170 ml of titanium tetrachloride were added and reacted at 95° C. for 3 hours. After the reaction, the solid product was separated from liquid phase at 95° C. and washed at that temperature twice with each 150 ml portions of toluene. The above-mentioned treatment using a mixture of butyl ether and titanium tetrachloride was once repeated for one hour, after which it was washed twice with each 150 ml portions of heptane and dried under reduced pressure. Thus, 39.6 g of a brown-colored solid catalyst component was obtained.

The solid catalyst component thus obtained contained 0.33 millimole of titanium atom and 2.60 millimoles of magnesium atom. Its pore volume dvp was 0.33.

(3) Copolymerization of Ethylene and Butene-1

A polymerization was carried out in the same manner as in Example 1, except that the solid catalyst component obtained in (2) of this example was used. The copolymer thus obtained was narrow in molecular weight distribution and composition distribution similarly to that of Example 1.

EXAMPLE 10

(1) Synthesis of Solid Product

After replacing the inner atmosphere of a flask having a capacity of 300 ml and equipped with a stirrer and a dropping funnel with argon gas, 25.5 g of the silica gel prepared in Example 1, calcined at 800° C., was charged together with 100 ml of heptane and 12.2 ml of tetrabutoxytitanium, and the content of the flask was stirred at 20° C. for 30 minutes. Then, while keeping the inner temperature of the flask at 5° C., 17.3 ml of the organomagnesium compound synthesized in Example 1-(1) was dropped into the flask from the dropping funnel over a period of 30 minutes. After dropping it, the resulting mixture was stirred at 5° C. for 30 minutes and then at 20° C. for one hour, and then it was allowed to stand at room temperature to separate the solid product from liquid phase. Further, it was washed thrice with each 120 ml portions of heptane and dried under reduced pressure. Thus, a black-brown colored solid product was obtained.

(2) Synthesis of Solid Catalyst Component

After replacing the inner atmosphere of a flask having a capacity of 300 ml with argon gas, 26.0 g of the solid product prepared in (1) and 87 ml of toluene were charged into the flask, and inner temperature of the flask was kept at 95° C.

Then, a mixture of 2.6 ml of butyl ether and 52 ml of titanium tetrachloride was added and reacted at 95° C. for one hour.

After the reaction, the reaction mixture was allowed to stand to separate the solid product from liquid phase, and the solid product was washed at 95° C. four times with each 150 ml portions of toluene and dried under reduced pressure to obtain 26.8 g of a red-violet colored solid product.

One gram of this solid catalyst contained 0.88 millimole of titanium atom and 0.90 millimole of magnesium atom. Its pore volume dvp was 0.37.

(3) Copolymerization of Ethylene and Butene-1

A polymerization was carried out in the same manner as in Example 1, except that the solid catalyst component obtained in (2) of this example was used. The copolymer thus obtained was narrow in molecular weight distribution and composition distribution similarly to that of Example 1.

The polymerization conditions in the above-mentioned examples are summarized in Table 1, and the results are shown in Table 2.

TABLE 1

| | Catalyst system | | | Comonomer | | Polymerization temperature (°C.) |
|---|---|---|---|---|---|---|
| | Porous Carrier* | Organoaluminum component | Atomic ratio Al/Ti | Kind | % by mole | |
| Example 1 | Silica gel A | EASC | 6.7 | Butene-1 | 40 | 230 |
| Comparative Example 1 | None | " | 4.5 | " | " | " |
| Comparative Example 2 | Silica gel B | " | 8.9 | " | " | " |
| Comparative Example 3 | Silica gel A | " | 10.9 | " | " | " |
| Example 2 | " | " | 10.1 | " | " | " |
| Example 3 | " | EASC/0.1-Si(OEt)₄ | 10.2 | " | " | " |
| Example 4 | " | " | 9.0 | " | 55 | " |
| Example 5 | " | " | 5.6 | Hexene-1 | 40 | " |
| Comparative Example 4 | None | " | 6.5 | " | " | " |
| Example 7 | Silica gel C | EASC | 11.2 | Butene-1 | 40 | " |
| Example 8 | Alumina | " | 15.3 | " | " | " |
| Example 9 | Polymer beads | " | 11.3 | " | " | " |
| Example 10 | Silica gel A | " | 12.4 | " | " | " |

Polymerization pressure: 800 kg/cm²; Residence time of polymerization: 45 seconds
*Silica gel A: Grade 952, manufactured by Fuji Devision Kagaku K.K., dvp = 0.89
Silica gel B: Grade 4B, manufactured by Fuji Devision Kagaku K.K., dvp = 0.15
Silica gel C: Supermicro Beads, manufactured by Fuji Devision Kagaku K.K., dvp = 0.80
Alumina: Grade ACP-1, manufactured by Shokubai Kasei K.K., dvp = 0.91
Polymer beads: Chromosorb 101, manufactured by Johns-Manville Co., dvp = 0.54

TABLE 2

| | Catalyst activity (g-polymer/ g-transition metal) | MI (g/10 min.) | Density (g/cm³) | $M_w/M_n$ | $\bar{T}_m$ (°C.) |
|---|---|---|---|---|---|
| Example 1 | 92,000 | 3.61 | 0.916 | 3.1 | 96.8 |
| Comparative Example 1 | 113,000 | 3.85 | 0.917 | 4.1 | 103.2 |
| Comparative Example 2 | 61,000 | 3.82 | 0.917 | 4.0 | 102.6 |
| Comparative Example 3 | 13,000 | — | — | — | — |
| Example 2 | 94,000 | 3.54 | 0.916 | 3.2 | 97.0 |
| Example 3 | 91,000 | 2.55 | 0.919 | 3.1 | 99.6 |
| Example 4 | 63,000 | 10.1 | 0.901 | 3.3 | 94.0 |
| Example 5 | 62,000 | 2.15 | 0.918 | 3.5 | 105.5 |
| Comparative Example 4 | 74,000 | 2.59 | 0.918 | 4.3 | 109.6 |
| Example 7 | 89,000 | 4.02 | 0.917 | 3.1 | 96.9 |
| Example 8 | 92,000 | 3.98 | 0.918 | 3.0 | 96.6 |
| Example 9 | 88,000 | 3.51 | 0.915 | 3.1 | 96.5 |
| Example 10 | 86,000 | 1.91 | 0.921 | 3.3 | 99.8 |

The catalyst used in the process of the present invention has a high catalyst activity per transition metal. Accordingly, the quantity of catalyst residue in the resulting polymer is small, so that the step for removing catalyst can be omitted. Further, according to the process of the present invention, an olefin copolymer having narrow molecular weight distribution and composition distribution can be produced, and the copolymer is excellent in transparency, impact resistance and blocking resistance.

What is claimed is:

1. A solid catalyst component for olefin copolymerization containing a trivalent titanium compound, which is obtained by reducing a titanium compound respectively by the general formula $Ti(OR^1)_nX_{4-n}$ (wherein $R^1$ is a hydrocarbon group of 1 to 20 carbon atoms, X is a halogen atom, and n is a number satisfying $0 < n \leq 4$) with an organomagnesium compound in the presence of a porous carrier having a pore volume of, at pore radius of 50 to 5,000 Å, at least 0.2 ml/g to obtain a solid product, treating the solid product with a mixture of a dialhyl ether and titanium tetrachloride.

2. A solid catalyst component for olefin copolymerization according to claim 1, wherein the solid catalyst component is obtained by reducing a titanium compound represented by the general formula $TI(OR^1)_nX_{4-n}$ (wherein $R^1$, X and n are as defined above) with an organomagnesium compound in the presence of an organosilicon compound having at least Si—O bond which is represented by the following general formula:

$$Si(OR^3)_mR^4_{4-m}$$

$$R^5(R^6_2SiO)_pSiR^7_3 \text{ or}$$

$$(R^8_2SiO)_q$$

(wherein $R^3$ is a hydrocarbon group having 1 to 20 carbon atoms, $R^4$, $R^5$, $R^6$, $R^7$ and $R^8$ are each a hydrocarbon group having 1 to 20 carbon atoms or a hydrogen atom, m is a number satisfying $0 < m \leq 4$, p is an integer of 1 to 1,000, and q is an integer of 2 to 1,000) and a porous carrier having a pore volume of, at pore radius of 50 to 5,000 Å, at least 0.2 ml/g to obtain a solid product and treating the solid product with a mixture of a dialkyl ether and titanium tetrachloride.

3. A solid catalyst component for olefin copolymerization according to claim 1, wherein the hydrocarbon group $R^1$ of the titanium compound represented by the general formula $Ti(OR^1)_nX_{4-n}$ is alkyl groups having 2 to 18 carbon atoms and/or aryl groups having 6 to 18 carbon atoms.

4. A solid catalyst component for olefin copolymerization according to claim 1, wherein the X of the titanium compound represented by the general formula $Ti(OR^1)_n X_{4-n}$ is chlorine.

5. A solid catalyst component for olefin copolymerization according to claim 1, wherein the n of the titanium compound represented by the general formula $Ti(OR^1)_n X_{4-n}$ is a number satisfying $2 \leq n \leq 4$.

6. A solid catalyst component for olefin copolymerization according to claim 1, wherein the organomagnesium compound is a Grignard compound represented by the general formula $R^9 MgX$ (wherein $R^9$ is a hydrocarbon group having 1 to 20 carbon atoms and X is a halogen atom), or a dialkyl magnesium compound or a diaryl magnesium compound both represented by the general formula $R^{10} R^{11} Mg$ (wherein $R^{10}$ and $R^{11}$ are each a hydrocarbon group having 1 to 20 carbon atoms).

7. A solid catalyst component for olefin copolymerization according to claim 2, wherein the organosilicon compound having at least one Si—O bond is an alkoxysilane compound represented by the general formula $Si(OR^3)_m R^4_{4-m}$, in which m is a number satisfying $1 \leq m \leq 4$.

8. A solid catalyst component for olefin copolymerization according to claim 1, wherein the particle diameter of the porous carrier is in the range of 0.1 to 100 $\mu$m.

9. A solid catalyst component for olefin copolymerization according to claim 1, wherein the pore volume of, at pore radius of 50 to 5,000 Å, the porous carrier is 0.4 ml/g or more.

10. A solid catalyst for olefin copolymerization according to claim 2, wherein the organosilicon compound having Si—O bonds is used in an amount of 1 to 30 in terms of the atomic ratio of silicon atom to titanium compound.

11. A solid catalyst component for olefin copolymerization according to claim 1 or 2, wherein the organomagnesium compound is used in an amount of 0.1 to 10 in term of the atomic ratio of the sum of titanium atom and silicon atom to magnesium atom.

12. A solid catalyst component for olefin copolymerization according to claim 1, wherein the porous carrier is used in an amount of 20 to 90% by weight in terms of % by weight in solid product.

13. A solid catalyst component for olefin copolymerization according to claim 1 wherein the reduction is conducted at a temperature of $-50°$ C. to $70°$ C.

14. A solid catalyst component for olefin copolymerization according to claim 1, wherein the ether compound is used in an amount of 0.1 to 100 moles per 1 mole of titanium atom in solid product.

15. A solid catalyst component for olefin copolymerization according to claim 1, wherein the titanium tetrachloride is used in an amount of 1 to 1,000 moles per 1 mole of titanium atom in solid product and in an amount of 1 to 100 moles per 1 mole of ether compound.

16. A solid catalyst component for olefin copolymerization according to claim 1, wherein the solid product is treated with an ether compound and titanium tetrachloride in a slurry state using a solvent.

17. A solid catalyst component for olefin copolymerization according to claim 16, wherein the solvent is an aromatic hydrocarbon or a halogenated hydrocarbon.

18. A solid catalyst component for olefin copolymerization according to claim 7, wherein the organosilicon compound is tetraethoxysilane.

* * * * *